United States Patent
Obata et al.

[11] Patent Number: 5,930,077
[45] Date of Patent: Jul. 27, 1999

[54] MAGNETIC HEAD FOR RECORDING AND REPRODUCING A SIGNAL AND COMPRISING A SLIDER PROVIDED WITH A PROTECTIVE FILM INCLUDING AN INTERMEDIATE LAYER AND AN AMORPHOUS HARD CARBON LAYER

[75] Inventors: Takeshi Obata; Kazuhiro Baba, both of Tokyo, Japan

[73] Assignee: NEC Corporation, Japan

[21] Appl. No.: 08/666,644

[22] Filed: Jun. 18, 1996

Related U.S. Application Data

[63] Continuation of application No. 08/260,033, Jun. 15, 1994, abandoned.

[30] Foreign Application Priority Data

Jun. 17, 1993 [JP] Japan ................................ 5-145301

[51] Int. Cl.$^6$ ................................ G11B 5/60; B05D 3/06
[52] U.S. Cl. ........................ 360/103; 427/577; 360/122
[58] Field of Search .................................. 360/103, 119, 360/125, 126, 135, 122, 113; 427/577

[56] References Cited

U.S. PATENT DOCUMENTS

| | | | |
|---|---|---|---|
| 4,803,581 | 2/1989 | Kira et al. | 360/113 |
| 4,840,844 | 6/1989 | Futamoto et al. | 428/336 |
| 5,051,856 | 9/1991 | Narishige et al. | 360/126 |
| 5,126,907 | 6/1992 | Hamakawa et al. | 360/126 |
| 5,130,877 | 7/1992 | Hsie et al. | 360/126 |
| 5,151,294 | 9/1992 | Bleich et al. | 427/11 |
| 5,159,508 | 10/1992 | Grill et al. | 360/103 |
| 5,175,658 | 12/1992 | Chang et al. | 360/103 |
| 5,198,934 | 3/1993 | Kubo et al. | 360/103 |
| 5,260,106 | 11/1993 | Kawarada et al. | 427/577 |
| 5,260,107 | 11/1993 | Kawamura et al. | 427/577 |
| 5,331,492 | 7/1994 | Komai et al. | 360/113 |
| 5,336,550 | 8/1994 | Ganapathi et al. | 360/103 |
| 5,371,643 | 12/1994 | Yuito et al. | 360/113 |
| 5,374,463 | 12/1994 | Bethune et al. | 360/103 |
| 5,388,017 | 2/1995 | Franco et al. | 360/103 |
| 5,419,822 | 5/1995 | Dakesian et al. | 204/192.3 |
| 5,644,455 | 7/1997 | Schultz | 360/113 |

FOREIGN PATENT DOCUMENTS

| | | |
|---|---|---|
| 61-145718 | 7/1986 | Japan . |
| 64-76423 | 3/1989 | Japan . |
| 4-364217 | 12/1992 | Japan . |
| 5-282646 | 10/1993 | Japan ................................ 360/103 |
| 6-150599 | 5/1994 | Japan ................................ 360/103 |

OTHER PUBLICATIONS

S. Suzuki, et al., "Mechanical Properties of Hard Carbon Protective Layer for Thin Film Magnetic Disk", *Proceedings of the Japan International Tribology Conference Nagoya*, pp. 1881–1885; 1990.

*Primary Examiner*—Jefferson Evans
*Attorney, Agent, or Firm*—Ostrolenk, Faber, Gerb & Soffen, LLP

[57] ABSTRACT

A magnetic head for recording and reproducing a signal on and from a magnetic recording medium, comprises a slider, a magnetic resistance element supported by the slider, and a protective film provided on a sliding surface of the slider and a surface of the magnetic resistance element facing the magnetic recording medium. The protective film has an intermediate layer formed of at least one element selected from the group consisting of hard carbon, boron, titanium and aluminium, and carbides, nitrides and oxides of silicon, boron, titanium, or aluminum, and an amorphous hard carbon film formed on the intermediate layer. The protective film is 100 Å or less in thickness and the slider is formed of composite ceramic material of $Al_2O_3$ and TiC. The intermediate layer is formed by either one of a magnetron sputtering method, a direct current two electrode sputtering method, a high frequency (rf) sputtering method, and an ion beam sputtering method. The amorphous hard carbon film is formed by a rf plasma CVD method. In the protective film thus obtained, the amorphous hard carbon film contains hydrogen of 10 to 30 atomic % and the protective film is 8000 to 10000 kg/mm$^2$ in Vickers hardness. The magnetic head has a friction coefficient of 0.1 or less between the magnetic head and the magnetic recording medium after 20000 CSS cycles.

13 Claims, 2 Drawing Sheets

MAGNETIC HEAD FOR RECORDING AND REPRODUCING A SIGNAL AND COMPRISING A SLIDER PROVIDED WITH A PROTECTIVE FILM INCLUDING AN INTERMEDIATE LAYER AND AN AMORPHOUS HARD CARBON LAYER

This is a Continuation of application Ser. No. 08/260,033 filed on Jun. 15, 1994, now abandoned.

BACKGROUND OF THE INVENTION

1. Field of the Invention

The present invention relates to a thin film magnetic head used in recording and reproduction operations for a high density magnetic recording medium.

2. Description of Related Art

A magnetic disk and a magnetic head have been widely used in an information storage unit of a computer system as a magnetic disk unit. The magnetic disk is generally constructed such that the magnetic recording material is deposited on a substrate, for example of material such as aluminum and plastic in a thin film manner by sputtering. Magnetic recording materials include iron, cobalt, nickel or a compound of one of these metals, or they can be of rare earth metals such as neodymium, samarium and gadolinium or a compound of one of the rare earth metals. The magnetic head picks up an electric signal from magnetic fluxes corresponding to data which has been written in a magnetic recording medium, and records an electric signal in the magnetic recording medium in a magnetic flux form. The magnetic head has a non-magnetic ceramic substrate made of alumina ($Al_2O_3$) or titanium carbide (TiC), and a circuit element mounted on the non-magnetic substrate for recording and reproduction. The magnetic head is used as close to a magnetic disk surface as possible for increasing the recording density. Although various types of magnetic heads have been recently proposed for increasing of recording density, it is considered to be essential to mount a read head employing a magnetic resistance (MR) element for efficiently reading data recorded by high density recording.

In the MR head a voltage is applied to the MR element for reproduction in principle. Hence, a potential difference is generated between the MR head and the magnetic disk and in the worst case discharging is caused between the MR element and the magnetic disk because of the potential difference so that the MR element and the magnetic disk are damaged.

In order to prevent the damage of the MR element as described above, it is necessary to cover the MR element with a protective film superior in electrical insulation. More particularly, because the voltage of a few volts is applied to the MR element, the electric field of a few MV/cm is generated between the magnetic head and the magnetic disk.

Conventionally, an element of a magnetic head is protected with an $Al_2O_3$ film of a few $\mu$m in thickness and the $Al_2O_3$ film is usually not formed on the sliding surface of the magnetic head. This is the reason why the distance between the magnetic head and the magnetic disk becomes so wide that high density recording is difficult if the sliding surface of the magnetic head is covered with such a thick protective film. In addition, if the $Al_2O_3$ protective film is made thin to such an extent that high density recording is possible, there is the problem of the protective film being damaged because the protective film cannot resist the friction between the magnetic head and the magnetic disk because of so called "contact start stop (CSS) cycles".

For coping with this problem, there is a hard carbon film produced by a sputtering method as the protective film indicating high wear resistivity even in a thin film state and it has been used as the magnetic disk protective film. However, as described in, for example, the Proceedings of the International Tribology Conference, 1990, page 1881, the hard carbon film produced by the sputtering method is insufficient for lubricity and wear resistivity so that there is caused another problem that the friction coefficient becomes greater as contact friction is repeated. In practice, in a case where the hard carbon film produced by a sputtering method is used as the magnetic disk protective film, a lubricant coating is necessary. Further, the hard carbon film produced by a sputtering method has a fatal problem in that it is basically electrically conductive. Therefore, with respect to application of the hard carbon film to a magnetic head, because a lubricant cannot be coated in addition to the above problem, the hard carbon film produced by a sputtering method cannot be applied to the magnetic head as is.

In the highly developing information processing field, a technique capable of processing a great capacity of information is required and in conjunction with this high density recording and reproducing technique occupies an important position. For this purpose, it is necessary to make a gap between the MR element and the magnetic disk narrow as described above. More particularly, it is requested that the gap is 1000 Å or less. Thus, it is requested to make the protective film provided on the sliding surface of the MR head as thin as possible. The thickness of the protective film is preferably 300 Å or less, more preferably in a range of 50 to 100 Å.

However, there is no protective film produced by a sputtering method that has adequate electrical insulation and wear resistivity with a thickness of about 100 Å.

On the other hand, as described in Japanese Patent Application Sho-62-234328, an amorphous hard carbon film produced by a chemical vapor deposition (CVD) method has superior lubricity and wear resistivity even in a thickness of about 100 Å. In addition, the amorphous hard carbon film produced by a CVD method is electrically insulated unlike the hard carbon film produced by a sputtering method, and it is desirable for the MR head protective film.

However, the amorphous hard carbon film has a problem in that adhesion to a ceramic substrate for supporting the magnetic head is not good. This is because the energy of each of the particles coming to the substrate is very small in the CVD method when the film is deposited on the substrate.

In Japanese Unexamined Patent Publication (TokuKaiHei-JP-A-)4-364217, there is disclosed a protective film in which a hydrogen additive amorphous carbon film is adhered to a sliding portion with an adhesion layer. However, the protective film has the structure in which a carbon layer is adhered with the adhesive agent and the thickness of the film is so thick that the high density recording is difficult.

In this manner, in the above conventional technique, there cannot be realized a magnetic head with the protective film having superior characteristics in electrical insulation, wear resistivity, lubricity and adhesion.

SUMMARY OF THE INVENTION

An object of the present invention is to provide a magnetic head with a protective film having superior characteristics in electrical insulation, wear resistivity, lubricity and adhesion even at a thickness of about 100 Å or less.

According to the present invention, there is provided a magnetic head for recording and reproducing a signal on and from a magnetic recording medium. The magnetic head comprises: a slider; a magnetic resistance element supported by said slider; and a protective film provided on a sliding surface of said slider and a surface of said magnetic resistance element facing to said magnetic recording medium. Said protective film includes an intermediate layer formed of at least one element selected from the group consisting of hard carbon, silicon, boron, titanium and aluminum, and carbide, nitride and oxide of said silicon, boron, titanium, or aluminum, and a amorphous hard carbon film formed on said intermediate layer.

According to the present invention, there can be obtained an MR head having the superior adhesion of the intermediate layer and the superior electrical insulation, wear resistivity and lubricity of the amorphous hard carbon film, so that the quality of the protective film is good even in the thickness of 100 Å or less. Therefore, the magnetic head according to the present invention has the extremely thin protective film of 100 Å or less which is required for high density recording technique and is very useful.

DETAILED DESCRIPTION OF THE PREFERRED EMBODIMENTS

Figure 1:
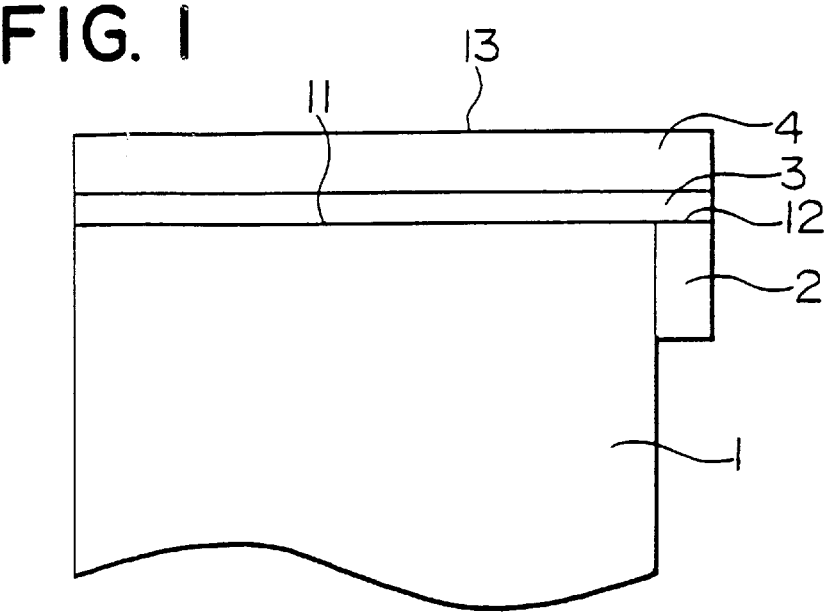
FIG. 1 is a cross sectional view showing the structure of a magnetic head according to an embodiment of the present invention.

The embodiments of the present invention will be described below with reference to the accompanying drawings. As shown in FIG. 1, in a magnetic head of the present embodiment, a magnetic resistance (MR) element 2 is supported by a slider 1 such that a sliding surface 11 of the slider 1 sliding with a magnetic disk is aligned with a surface 12 of the MR element 2 facing to the magnetic disk. An intermediate layer 3 is formed such that it substantially covers over the sliding surface 11 of the slider 1 and the surface 12 of the MR element 2 faces to the magnetic disk. The intermediate layer 3 is made of at least one element selected from the group consisting of hard carbon, boron, titanium, aluminum, carbide of each of these elements, nitride of each of these elements, and oxide of each of these elements. As the slider 1 can be used a non-magnetic material which can hold the MR element 2, e.g., ceramics such as $Al_2O_3$ or TiC. An amorphous hard carbon film 4 is provided on the intermediate layer 3.

The hard carbon and the amorphous hard carbon have a hardness of 8000 kg/mm$^2$ or more in Vickers hardness.

A sputtering method is used to form the intermediate layer 3. The sputtering methods available include a direct current two electrode sputtering method, a high frequency (rf) sputtering method, a magnetron sputtering method, and an ion beam sputtering method. Any one of these methods may be used, but a good result is obtained in the magnetron sputtering method with respect to the characteristics of the adhesion layer.

With respect to a sputtering target and a sputtering gas, a plate of the same element as the film to be formed, or a plate of a compound including the same element and argon gas may be used. Also, in a case where the intermediate layer to be formed is made of carbide, nitride or oxide, a plate of an element which is included in the film and a hydrocarbon gas, ammonia gas or oxygen gas may be used. Any of these methods may be used.

In order to form an amorphous hard carbon film 4 a rf plasma CVD (rf-p-CVD) method in which a mixture gas of $CH_4$ gas, $H_2$ gas and Ar gas is used as reactive gas is effective to deposit a good film at a low temperature.

Figure 2:
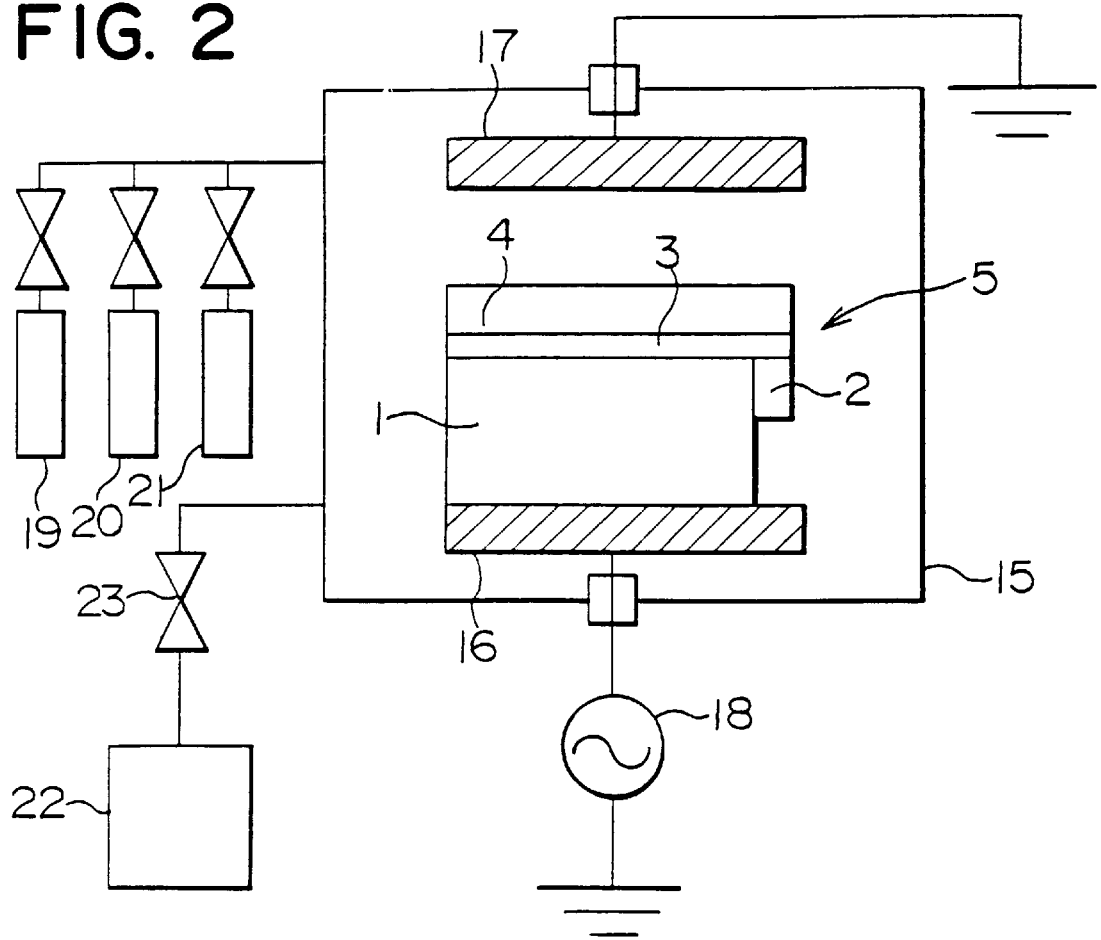
FIG. 2 shows an example of apparatus used for the deposition of a protective film of the magnetic head.

FIG. 2 shows a film deposition apparatus for this rf plasma CVD method. As shown in FIG. 2, a magnetic head 5 in which the intermediate layer 3 has been already formed on the surfaces of the slider 1 and the MR element 2 facing to the magnetic disk is provided on a substrate electrode 16 mounted in a vacuum chamber 15 in a state that the intermediate layer 3 is faced up, and an opposing electrode 17 of a flat plate type is mounted in parallel to the substrate electrode 16. The substrate electrode 16 is connected to an rf power supply 18 and the opposing electrode 17 is grounded. Thus, the rf discharge is generated between the electrodes 16 and 17. The vacuum chamber 15 is connected to a $CH_4$ gas bomb 19, an $H_2$ gas bomb 20 and an Ar gas bomb 21 from which gases are supplied to the vacuum chamber 15. Also, the chamber 15 is connected to an exhausting pump 22 via a valve 23. Thus, if the valve 23 is opened, the chamber 15 is evacuated by the exhausting pump 22.

In a case where the amorphous hard carbon film 4 is formed by the apparatus constructed in this manner, there is provided in the vacuum chamber 15 the magnetic head 5 with the intermediate layer of, for example, hard carbon film formed on the sliding surfaces 11 of the slider 1 and the surface 12 of the MR element 2 facing to the magnetic disk and a mixture gas of $CH_4$ gas, $H_2$ gas and Ar gas from the bombs 19, 20 and 21 as the reactive gas is introduced in the chamber 15 while the chamber 22 is exhausted by the exhausting pump 22. The rf power is applied across the electrodes 16 and 17 from the rf power supply 18 so that the amorphous hard carbon film 4 is formed by plasma CVD. Because the quality of the amorphous hard carbon film thus obtained is greatly dependent upon a mixture ratio of gases and the power applied to the electrode 16, optimal values need to be selected. The vacuum is adjusted to be in a range of 0.01 to 1 Torr by the exhausting pump 22 and the valve 23. When the mixture ratio of $CH_4$ gas and dilution gas ($H_2$ gas and Ar gas) is in a range of 0.01 to 0.2 (=$CH_4/(H_2+Ar)$), the film of good quality was obtained. When the power is in a range of 0.1 to 3 W/cm$^2$, the relatively good result was obtained.

Experiment 1

Figure 3:
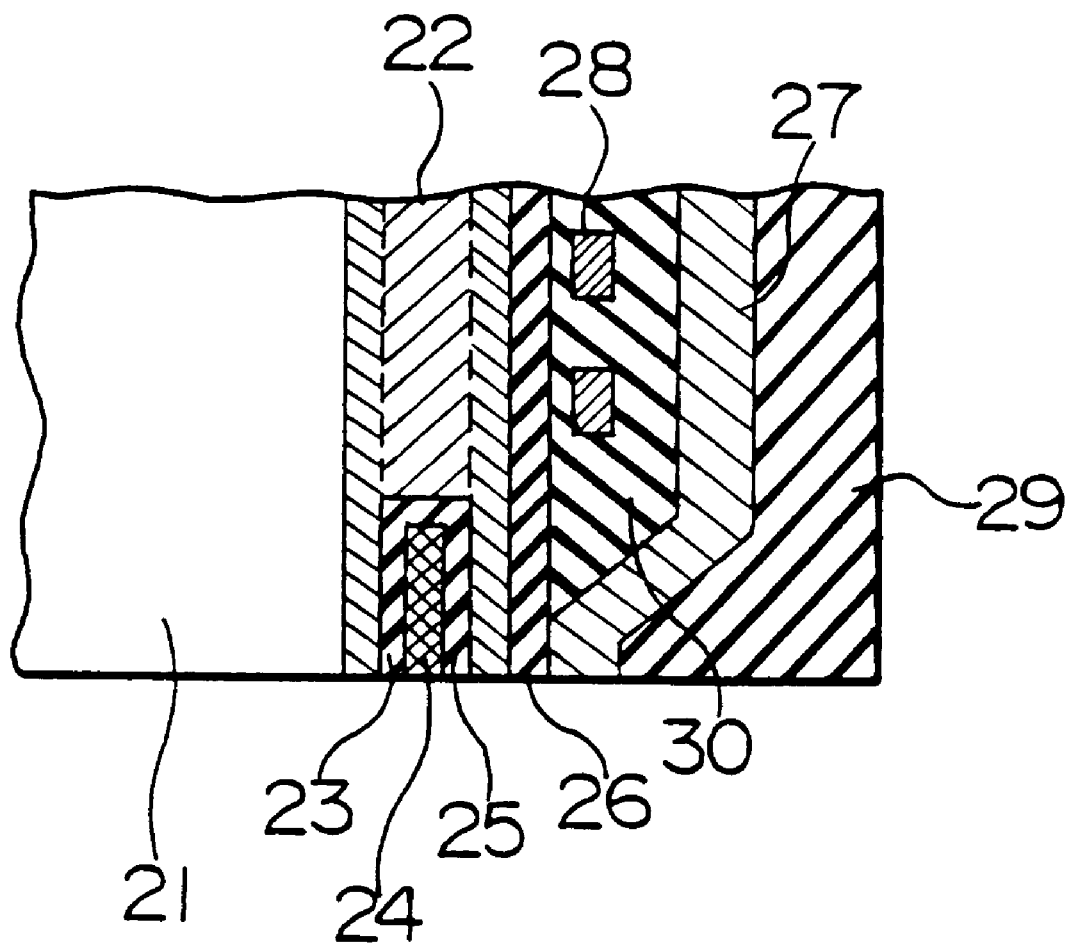
FIG. 3 is a cross sectional view showing the structure of the magnetic head of the present embodiment.

The characteristic of the magnetic head according to the embodiment of the present invention will be described with examples. A slider is made by mirror-polishing the composite sintered body of $Al_2O_3$ and TiC. The formation of the MR element was based on the method disclosed in Japanese Unexamined Patent Publication (TokuKaiShou) 61-145718. As shown in FIG. 3, the magnetic head includes the non-magnetic substrate 21, a lower thin film magnetic layer 22 formed on the non-magnetic substrate 21, a magnetic resistance effect element 24 which is formed to be buried into the lower thin film magnetic layer 22 via insulting films 23 and 25 and which is arranged at the position on which one end of the element 24 is exposed from one side surface of the magnetic head, an insulating film 26 formed on the lower thin film magnetic layer 22, a coil 28 formed to be buried in an insulating film 30 on the insulating film 26, an upper thin film magnetic layer 27, and a protection layer 29 formed on the upper thin film magnetic layer 27. In this manner, the magnetic head is a composite thin film magnetic head in which the induction type of thin film magnetic head and the magnetic resistance effect type of magnetic head are present. Thus, the magnetic head has the function of recording and reproduction.

The hard carbon film as the intermediate layer was formed under the pressure of the range of $10^{-3}$ to $10^{-2}$ Torr in the ambient of Ar gas with the rf power of 0.1 to 3 W/cm$^2$ at the room temperature by use of the usual rf magnetron sputtering apparatus. The thickness of the hard carbon film is 20 to 50 Å.

As a result of analysis based on the Rutherford backscattering (RBS) method and Proton recoil detection analysis (PRDA) method, 5 atomic % or less hydrogen was determined to be contained in the hard carbon film thus formed. It was confirmed from the observation with a transmission electron microscope (TEM) that the film includes fine crystals of carbon.

Next, the apparatus shown in FIG. 2 was used for the formation of the amorphous hard carbon film. The opposing electrode 17 was grounded and the magnetic head substrate 1 for the amorphous hard carbon film 4 to be formed was mounted on the substrate electrode 16 opposite the electrode 17. After the vacuum chamber 15 was exhausted to $10^{-7}$ Torr once, rf discharge was caused by applying the power of 0.1 to 3 W/cm$^2$ to the substrate electrode 16 from the rf power supply 18. A mixture gas of CH$_4$ gas, H$_2$ gas and Ar gas was introduced with a flow ratio within a range of 0.01 to 0.1 (=CH$_4$/(H$_2$+Ar)) and the amorphous hard carbon film 4 was deposited. Upon the deposition of the film, the pressure was in a range of 0.01 to 1 Torr and the substrate temperature was substantially at the room temperature. The thickness of the amorphous hard carbon film 4 was controlled to be 30 to 100 Å based on the reaction time.

As a result of the analysis of the RBS method and PRDA method, hydrogen of 10 to 30 atomic % was determined to be contained in the amorphous hard carbon film formed in this manner.

The protective film of the MR head thus formed had extremely good electrical insulation with a breakdown voltage of 8 MV/cm at a minimum and 10 MV/cm or more on an average being obtained from the current vs. voltage measurement. Even if the signal recorded on a magnetic disk recording medium was repetitively reproduced, the damage of the MR element and the magnetic disk because of discharge between the MR element and the magnetic disk was not caused.

The MR head (in this embodiment) in which the protective film defined in the present invention was provided on the sliding surface of the slider was compared with comparison examples, i.e., the MR head with no protective film, the MR head in which only the hard carbon film by a rf magnetron sputtering method was provided as the protective film, and the MR head in which only the amorphous hard carbon film by an rf-p-CVD method was provided as the protective film, with respect to a plurality of samples to determine the ratio (%) of destroyed samples when the voltage applied to the MR element was changed. The thickness of the protective film was 100 Å for every sample. The result is shown in the following table 1.

TABLE 1

| applied voltage (V) | protective film in example | comparative examples |  |  |
|---|---|---|---|---|
| | | no protective film | only hard carbon film | only amorphous hard carbon film |
| 1 | 0 | 86 | 67 | 0 |
| 2 | 0 | 14 | 25 | 0 |
| 3 | 0 | 0 | 8 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| 8 | 5 | 0 | 0 | 7 |
| 9 | 16 | 0 | 0 | 15 |
| 10 | 24 | 0 | 0 | 31 |
| more than 10 | 55 | 0 | 0 | 47 |
| total | 100 | 100 | 100 | 100 |

Since the voltage actually applied to the MR head was about 2 V, the MR head with the protective film of the present invention and the MR head with only the amorphous hard carbon film are available in practice with respect to the electrical insulation.

In addition, the MR head in which the protective film of the present invention was provided as in the example was compared with the MR head (comparative example) in which only the amorphous hard carbon film was provided as the protective film to observe the reproduction state of a signal when the CSS cycle was repeated, for a plurality of samples. As a result, the samples of 90% or more were fault in the MR head with only the amorphous hard carbon protective film (comparative example) after the CSS cycle was repeated a few hundreds times while the reproduction signal was good in every sample in the MR head with the protective film of the present invention (example) after the CSS cycle was repeated 20000 times. When the MR head with only the amorphous hard carbon protective film (comparative example) in fault was observed with a microscope, the peeling of the protective film and the damage of the MR element was observed.

On the other hand, the MR element is greatly corrosive because of the material. The MR head with the protective film of the present invention was exposed under various temperatures and humidities to determine whether or not the MR element was corroded. As a result, the MR element was found not to be corroded after 10000 hours. For the comparison, the same experiment was performed for the MR element with no protective film and the MR element was found to be corroded after 50 hours.

Further, the wear resistivity of lubricity of the protective film was evaluated based on so called CSS-$\mu$ test method in which a friction coefficient p was measured while the CSS cycle was repeated. This test was performed with contact load of the magnetic head applied to the magnetic disk being 20 g/cm$^2$ and with the rotation speed of the magnetic disk of 3600 rpm by use of the magnetic disk of 3.5 inch in diameter in which the hard carbon protective film was provided on the magnetic medium. The number of CSS cycles and the variation of a friction coefficient between the MR head and the magnetic disk were measured for the magnetic head in which the protective film of 100 Å was formed. As a result, the friction coefficient after the 20000 CSS cycles was 0.1 or less even in a case that lubricant was not used and the superior lubricity is obtained. The hardness of the MR head protective film was 8000 to 10000 kg/mm$^2$ in Vickers hardness and any wear was not caused on the magnetic head surface during the CSS test. For the comparison the same test was performed for the magnetic head with only the hard carbon film of 100 Å formed by the rf magnetron sputtering method as the protective film. As a result, the friction coefficient raised to 1.0 after 20000 CSS cycles and the abrasion of the protective film was recognized.

Experiment 2

First, as the slider was used one obtained by polishing $Al_2O_3$/TiC sintering body in a mirror manner. The formation of the MR element was based on the method disclosed in said Japanese Unexamined Patent Publication (TokuKaiShou) 61-145718. The intermediate layers of silicon, boron, titanium, aluminum, carbide of each of these elements, nitride of each of these elements, and oxide of each of these were prepared as samples, respectively. The intermediate layer was formed under the pressure of the range of $10^{-3}$ to $10^{-2}$ Torr in the ambient of Ar gas with the rf power of 0.1 to 3 W/cm$^2$ at the room temperature by use of the usual rf magnetron sputtering apparatus having a target made of an element or a compound of the element contained in the intermediate layer. The thickness of the intermediate layer was in a range of 20 to 50 Å for all the samples.

Next, the formation of the amorphous hard carbon film was made by the same method as in the experiment 1.

The protective films of the magnetic heads thus formed all had extremely good electrical insulation with the breakdown voltage of 7 MV/cm at a minimum and 10 MV/cm or more on an average being obtained from the current vs. voltage measurement. Even if the signal recorded on a magnetic disk recording medium was repetitively reproduced, the damage of the MR element and the magnetic disk because of discharge between the MR element and the magnetic disk was not caused.

The MR head (according to the example) in which the protective film of the present invention was provided on the sliding surface of the slider was compared with an example, i.e., the MR head with no amorphous hard carbon film and only the intermediate layer to determine the destroyed ones from among a plurality of samples when the voltage applied to the MR element was changed. The thickness of the protective film was 100 Å for every sample. As a result, the destroyed MR element could not be found up to 7 V for every sample in the MR head with the protective film of the present invention. However, the destroyed MR element with voltage of 2 V or less could be found for every sample in the MR head with only the intermediate layer.

In addition, the reproduction state of a signal when the CSS cycle was repeated was observed for a plurality of samples of the MR head in which the protective film 100 Å according to the present invention was provided on the sliding surface. The applied voltage to the MR head was set to 2 V. As a result, all the samples were in a good state after the CSS cycle is repeated 20000 times.

Next, the MR head with the protective film of the present invention was located under various temperatures and humidities to determine whether or not the MR element was corroded. As a result of this, the MR element was recognized to be not corroded after 10000 hours.

Further, the wear resistivity of lubricity of the protective film was evaluated based on so called CSS-$\mu$ test method. The test method was the same as in the experiment 1. As a result, the friction coefficient after the 20000 CSS cycles is 0.1 or less even in a case that lubricant was not used and indicated the superior lubricity. The hardness of the MR head protective film is 8000 to 10000 kg/mm$^2$ in Vickers hardness and any abrasion was not caused on the magnetic head surface during the CSS test.

It should be noted that although the intermediate layer made of one element or carbide, nitride or oxide of the element is used in the above embodiment, the same effect can be obtained even if the intermediate layer made of composition of two or more of the above materials is used.

What is claimed is;:

1. A magnetic head for recording and reproducing a signal on and from a magnetic recording medium, comprising:
   a slider having a sliding surface;
   a magnetic resistance element supported by said slider and having a surface facing said magnetic recording medium; and
   a protective film provided on said sliding surface of said slider and said surface of said magnetic resistance element facing said magnetic recording medium, said protective film including an intermediate layer formed of at least one material selected from the group consisting of hard carbon, boron, titanium and aluminum, and carbides, nitrides and oxides of silicon, boron, titanium, or aluminum, and an amorphous hard carbon film formed on said intermediate layer to a thickness of 30 Å to about 45 Å, said intermediate layer being formed by one of a magnetron sputtering method, a direct current two electrode sputtering method, a high frequency (rf) sputtering method, and an ion beam sputtering method, thereby to provide a strong contact between said slider and said protective film, and said amorphous hard carbon film being formed by a high frequency (rf) plasma CVD method.

2. A magnetic head according to claim 1, wherein said slider is formed of composite ceramic material of $Al_2O_3$ and TiC.

3. A magnetic head according to claim 1, wherein in the sputtering method there is used a target plate made of an element or a compound of the element contained in the intermediate layer to be formed and sputtering gas including argon gas is used.

4. A magnetic head according to claim 1, where in the sputtering method there is used a target plate made of one of elements contained in the intermediate layer to be formed and sputtering gas including hydrocarbon gas, ammonia gas and oxygen gas is used.

5. A magnetic head according to claim 1, wherein said amorphous hard carbon film contains hydrogen of 10 to 30 atomic %.

6. A magnetic head according to claim 1, wherein said protective film is 8000 to 10000 kg/mm$^2$ in Vickers hardness.

7. A magnetic head according to claim 1, wherein a friction coefficient between the magnetic head and said magnetic recording medium is 0.1 or less after 20000 CSS cycles.

8. A magnetic head according to claim 1, wherein said surface of said magnetic resistance element is adjacent to and coplanar with said sliding surface of said slider, and said protective film is provided on all of said sliding surface of said slider and all of said surface of said magnetic resistance element facing said magnetic recording medium.

9. A magnetic head for recording and reproducing a signal on and from a magnetic recording medium, comprising:
   a slider having a sliding surface;
   a magnetic resistance element supported by said slider and having a surface facing said magnetic recording medium which surface is adjacent to and coplanar with said sliding surface; and a protective film provided on all of said sliding surface of said slider and all of said surface of said magnetic resistance element facing said magnetic recording medium, said protective film including an intermediate layer formed of at least one material selected from the group consisting of hard carbon, boron, titanium and aluminum, and carbides, nitrides and oxides of silicon, boron, titanium, or aluminum, and an amorphous hard carbon film formed on said intermediate layer to a thickness of 30 Å to about 45 Å, said intermediate layer being formed by one of a magnetron sputtering method, a direct current two-electrode sputtering method, a high frequency (rf) sputtering method, and an ion beam sputtering method, thereby to provide a strong contact between said slider and said protective film, and said amorphous hard carbon film being formed by a high frequency (rf) plasma CVD method.

10. A magnetic head for recording and reproducing a signal on and from a magnetic recording medium, comprising:

a slider having a sliding surface;

a magnetic resistance element supported by said slider and having a surface facing said magnetic recording medium; and a protective film provided on said sliding surface of said slider and said surface of said magnetic resistance element facing said magnetic recording medium, said protective film including an intermediate layer formed of at least one material selected from the group consisting of hard carbon, boron, and titanium, and carbides, nitrides, and oxides of silicon. boron, or titanium, and an amorphous hard carbon film formed on said intermediate layer to a thickness of 30 Å to about 45 Å, said intermediate layer being formed by one of a magnetron sputtering method, a direct current two electrode sputtering method, a high frequency (rf) sputtering method, and an ion beam sputtering method, thereby to provide a strong contact between said slider and said protective film, and said amorphous hard carbon film being formed by a high frequency (rf) plasma CVD method.

11. A magnetic head for recording and reproducing a signal on and from a magnetic recording medium, comprising:

a slider having a sliding surface;

a magnetic resistance element supported by said slider and having a surface facing said magnetic recording medium which surface is adjacent to and coplanar with said sliding surface; and a protective film provided on all of said sliding surface of said slider and all of said surface of said magnetic resistance element facing said magnetic recording medium, said protective film including an intermediate layer formed of at least one material selected from the group consisting of hard carbon, boron, and titanium, and carbides, nitrides and oxides of silicon, boron, or titanium, and an amorphous hard carbon film formed on said intermediate layer to a thickness of 30 Å to about 45 Å, said intermediate layer being formed by one of a magnetron sputtering method, a direct current two electrode sputtering method, a high frequency (rf) sputtering method, and an ion beam sputtering method, thereby to provide a strong contact between said slider and said protective film, and said amorphous hard carbon film being formed by a high frequency (rf) plasma CVD method.

12. A magnetic head for recording and reproducing a signal on and from a magnetic recording medium, comprising:

a slider having a sliding surface;

a magnetic resistance element supported by said slider and having a surface facing said magnetic recording medium; and a protective film provided on said sliding surface of said slider and said surface of said magnetic resistance element facing said magnetic recording medium, said protective film including an intermediate layer formed of silicon carbide, and an amorphous hard carbon film formed on said intermediate layer to a thickness of 30 Å to about 45 Å, said intermediate layer being formed by one of a magnetron sputtering method, a direct current two electrode sputtering method, a high frequency (rf) sputtering method, and an ion beam sputtering method, thereby to provide a strong contact between said slider and said protective film, and said amorphous hard carbon film being formed by a high frequency (rf) plasma CVD method.

13. A magnetic head for recording and reproducing a signal on and from a magnetic recording medium, comprising:

a slider having a sliding surface;

a magnetic resistance element supported by said slider and having a surface facing said magnetic recording medium which surface is adjacent to and coplanar with said sliding surface; and a protective film provided on all of said sliding surface of said slider and all of said surface of said magnetic resistance element facing said magnetic recording medium, said protective film including an intermediate layer formed of silicon carbide and an amorphous hard carbon film formed on said intermediate layer to a thickness of 30 Å to about 45 Å, said intermediate layer being formed by one of a magnetron sputtering method, a direct current two electrode sputtering method, a high frequency (rf) sputtering method, and an ion beam sputtering method, thereby to provide a strong contact between said slider and said protective film, and said amorphous hard carbon film being formed by a high frequency (rf) plasma CVD method.

* * * * *